(12) United States Patent
Kwon et al.

(10) Patent No.: US 10,790,550 B2
(45) Date of Patent: Sep. 29, 2020

(54) SECONDARY BATTERY PACK INCLUDING A PRINTED CIRCUIT

(71) Applicant: SK INNOVATION CO., LTD., Seoul (KR)

(72) Inventors: Dae Won Kwon, Daejeon (KR); O Sung Kwon, Daejeon (KR); Seok Chun Cho, Daejeon (KR); Sei Hoon Cho, Daejeon (KR); Ho Chul Kang, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 194 days.

(21) Appl. No.: 15/625,767

(22) Filed: Jun. 16, 2017

(65) Prior Publication Data
US 2017/0365887 A1    Dec. 21, 2017

(30) Foreign Application Priority Data
Jun. 17, 2016    (KR) .................... 10-2016-0075911

(51) Int. Cl.
*H01M 10/48*    (2006.01)
*H01M 10/6557*    (2014.01)
(Continued)

(52) U.S. Cl.
CPC ......... *H01M 10/48* (2013.01); *H01M 2/1077* (2013.01); *H01M 2/202* (2013.01); *H01M 2/206* (2013.01); *H01M 2/305* (2013.01); *H01M 2/34* (2013.01); *H01M 10/425* (2013.01); *H01M 10/4207* (2013.01); *H01M 10/613* (2015.04); *H01M 10/625* (2015.04); *H01M 10/6551* (2015.04); *H01M 10/6556* (2015.04); *H01M 10/6557* (2015.04); *H01M 2010/4271* (2013.01); *H01M 2200/00* (2013.01)

(58) Field of Classification Search
CPC ............ H01M 10/613; H01M 2/1077; H01M 10/425; H01M 10/6551; H01M 10/6556; H01M 10/6555
See application file for complete search history.

(56) References Cited

U.S. PATENT DOCUMENTS

| 2010/0052692 A1 | 3/2010 | Yano et al. |
| 2010/0151312 A1 | 6/2010 | Kim et al. |

(Continued)

FOREIGN PATENT DOCUMENTS

| EP | 2 362 463 | 8/2011 |
| EP | 2 955 780 | 12/2015 |

(Continued)

OTHER PUBLICATIONS

The extended European search report issued by the European Patent Office dated Nov. 29, 2017.
(Continued)

*Primary Examiner* — Imran Akram
(74) *Attorney, Agent, or Firm* — IP & T Group LLP

(57) ABSTRACT

A secondary battery pack includes: a secondary battery module including battery cells and cooling fins; a first structure provided under the secondary battery module and including a cooling channel and a coupling bracket; and a second structure provided over the secondary battery module and including a printed circuit board.

16 Claims, 9 Drawing Sheets

(51) Int. Cl.
  *H01M 2/20*      (2006.01)
  *H01M 10/42*     (2006.01)
  *H01M 2/30*      (2006.01)
  *H01M 10/613*    (2014.01)
  *H01M 10/6551*   (2014.01)
  *H01M 10/625*    (2014.01)
  *H01M 2/34*      (2006.01)
  *H01M 10/6556*   (2014.01)
  *H01M 2/10*      (2006.01)

(56) References Cited

U.S. PATENT DOCUMENTS

| | | | | |
|---|---|---|---|---|
| 2010/0273042 | A1* | 10/2010 | Buck | H01M 10/613 |
| | | | | 429/120 |
| 2012/0009455 | A1* | 1/2012 | Yoon | H01M 10/653 |
| | | | | 429/120 |
| 2012/0148889 | A1* | 6/2012 | Fuhr | H01M 10/6556 |
| | | | | 429/87 |
| 2012/0171532 | A1* | 7/2012 | Lee | H01M 10/6557 |
| | | | | 429/72 |
| 2012/0270075 | A1* | 10/2012 | Fujimura | H01M 10/6551 |
| | | | | 429/7 |
| 2013/0004822 | A1* | 1/2013 | Hashimoto | H01M 10/6554 |
| | | | | 429/120 |
| 2015/0037662 | A1* | 2/2015 | Pinon | H01M 2/0237 |
| | | | | 429/179 |
| 2015/0079443 | A1 | 3/2015 | Buck et al. | |
| 2016/0036019 | A1 | 2/2016 | Gunna et al. | |
| 2016/0087319 | A1* | 3/2016 | Roh | H01M 10/647 |
| | | | | 429/62 |
| 2016/0093929 | A1* | 3/2016 | Obasih | H01M 10/0525 |
| | | | | 429/120 |

FOREIGN PATENT DOCUMENTS

| | | |
|---|---|---|
| JP | 2015-76187 | 4/2015 |
| KR | 10-2011-0097666 | 8/2011 |
| KR | 10-2014-0015859 | 2/2014 |
| KR | 101355961 | 2/2014 |
| KR | 10-2014-0143854 | 12/2014 |
| KR | 1020150108082 | 9/2015 |
| KR | 10-2015-0137840 | 12/2015 |

OTHER PUBLICATIONS

Office Action issued by the Korean Intellectual Property Office dated Jul. 15, 2020.

* cited by examiner

SECONDARY BATTERY PACK INCLUDING A PRINTED CIRCUIT

CROSS REFERENCE TO RELATED APPLICATIONS AND CLAIM OF PRIORITY

The application claims the benefit of Korean Patent Application No. 10-2016-0075911, filed on Jun. 17, 2016, at the Korean Intellectual Property Office, the disclosures of which are incorporated herein in their entirety by reference.

BACKGROUND OF THE INVENTION

1. Field of the Invention

The present invention relates to a secondary battery pack.

2. Description of the Related Art

Research into a rechargeable secondary battery has been actively conducted for various devices such as a digital camera, a cellular phone, a laptop computer, a hybrid automobile, and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries in series with each other. Since this lithium secondary battery has operating voltage three times higher than that of the nickel-cadmium battery or the nickel-metal hydride battery and has excellent energy density characteristics per unit weight which exceed that of the nickel-cadmium battery or the nickel-metal hydride battery, the use of the lithium secondary battery has rapidly increased.

A conventional battery pack 1 includes a printed circuit board, a connector, a wiring harness, and the like, as well as covers and protective structures for protecting these components. As shown in FIG. 1, a wiring harness 2 is formed in a battery pack 1 and includes many protective structures, such as a stand portion 3 into which the wiring harness 2 is inserted and aligned, an aligning portion 4 for protecting the wiring harness 2, a stand plate 5 on which the stand portion 3 is mounted and aligned, coupling ribs 6, an aligning cover 7, and the like. As such, the conventional battery pack 1 includes many components for protecting the wiring harness 2. Therefore the number of assembling processes and a volume of the battery pack 1 are increase.

The conventional battery pack 1 includes components for protecting a battery management system (BMS), a connector, and the like, as well as protector components for protecting the wiring harness. Herein, protective components such as upper and lower covers of the battery pack make up a considerable portion of the battery pack.

As such, a weight and a volume density of the conventional battery module tend to increase due to duplicated protective structures, for example, a cartridge, a partition, the upper and lower covers, and the like.

In a conventional battery pack, an apparatus for containing the battery pack, which includes a stack in which a plurality of battery housing units are provided, is disclosed in Korean Patent Registration No. 10-1355961 which was registered on Jan. 21, 2014.

SUMMARY OF THE INVENTION

An object of the present invention is to provide a secondary battery pack capable of reducing the number of duplicate protective structures disposed therein and integrating a plurality of functions into one.

In addition, another object of the present invention is to provide a secondary battery pack capable of reducing the number of parts by integrating a lower cover structure, a cooling structure, and a vehicle mounting bracket of a secondary battery module into one unit.

Further, another object of the present invention is to provide a secondary battery pack capable of reducing a volume and a weight density with a reduced number of parts.

Further, another object of the present invention is to provide a secondary battery pack capable of being assembled with the reduced number of processes.

According to an aspect of the present invention, there is provided a secondary battery pack, including: a secondary battery module including battery cells and cooling fins; a first structure provided under the secondary battery module and including a cooling channel and a coupling bracket; and a second structure provided over the secondary battery module and including a printed circuit board.

Herein, the first structure may include: a plate; wherein the cooling channel is formed in the plate, and the coupling bracket is formed along a first side of the plate.

In addition, the cooling channel includes an inflow channel and an outflow channel, a coolant is introduced into the inflow channel and discharged from the outflow channel, the inflow channel is formed along a second side of the plate, and the outflow channel is formed along a third side of the plate.

Further, the plate may have a plurality of stepped parts formed over the plate. The stepped parts are disposed apart from each other, and the secondary battery module is mounted between the stepped parts.

Further, the plate may have a placing portion is defined along a fourth side of the plate, a switch member is provided in the placing portion, and the switch member includes a relay, a fuse, or both.

Further, the secondary battery module may have a structure in which each of the cooling fins includes an upper extension and a lower extension, the secondary battery module, the first structure, and the second structure are stacked in a first direction, each of the cooling fins extends in the first direction, the upper extension extends from a top of each of the cooling fins in a second direction, the lower extension extends from a bottom of each of the cooling fins in the second direction, the upper extension is coupled to a neighboring upper extension to form an upper exterior of the secondary battery module, and the lower extension is coupled to a neighboring upper extension to form a lower exterior of the secondary battery module.

Further, the secondary battery module may include a terminal bus bar and electrode tabs. Each of the electrode tabs extends from each of the battery cells, the terminal bus bar electrically connects the electrode tabs to each other, and the terminal bus bar contacts the printed circuit board.

Further, the secondary battery module may include: a terminal unit and first and second electrode tabs, wherein the secondary battery module further includes a terminal unit and first and second electrode tabs; wherein the battery cells includes first and second battery cells, wherein the first and the second electrode tabs extend from the first and the second battery cells, respectively, wherein the terminal unit includes a first contact terminal and a first wing terminal, wherein the first contact terminal is disposed between the first and the second electrode tabs and connects the first and the second electrode tabs to each other, and wherein the first wing terminal extends outwardly from the first contact terminal.

Further, the secondary battery module further includes third and fourth electrode tabs, the battery cells includes third and fourth battery cells, the third battery cell is located next to the second battery cell, the third and the fourth electrode tabs extend from the third and the fourth battery cells, respectively, the terminal unit further includes a second contact terminal and a second wing terminal, the second contact terminal is disposed between the third and the fourth electrode tabs and connects the third and the fourth electrode tabs to each other, the second wing terminal extends outwardly from the second contact terminal, and the second wing terminal faces the first wing terminal.

Further, the secondary battery pack may further include a jig insertion space, wherein the jig insertion space is defined by (i) the first and the second wing terminals, (ii) the second and the third battery cells, and (iii) the second and the third electrode tabs.

Further, a terminal bus bar may be coupled to the first and the second wing terminals.

Further, the terminal bus bar may be coupled to the printed circuit board.

Further, the second structure may include: a housing; a barrier formed in the housing; and a printed circuit board and a wiring harness which are disposed between the housing and the barrier.

Further, the printed circuit board may include a contact terminal piece configured to measure a voltage, and the contact terminal piece contacts a terminal bus bar of the secondary battery module to measure a voltage.

Furthermore, the second structure may have an opening, wherein the opening is formed directly over the placing portion, so that the switch member is replaced with a new switch member through the opening.

According to another aspect of the present invention, there is provided a secondary battery pack, including: a secondary battery module including battery cells and cooling fins; a first structure provided under the secondary battery module to protect the secondary battery module and cool the secondary battery module; and a second structure provided over the secondary battery module to protect the secondary battery module, and including a measurement control circuit, wherein the measurement control circuit measures and controls a voltage of the secondary battery module.

Further, the second structure may include a contact terminal piece, wherein the contact terminal piece is mounted on the secondary battery module, elastically contacts the measurement control circuit and the secondary battery module, and electrically connects the measurement control circuit and the secondary battery module to each other.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, specific embodiments of the present invention will be described with reference to the accompanying drawings. But, these are only examples, and the present invention is not limited thereto.

In the description of the present invention, detailed descriptions of well-known functions and configurations are omitted for conciseness. In addition, terms or words used in the specification and claims should not be construed as limited to a lexical meaning, and should be interpreted as definitions known by one of ordinary skill in the art.

However, those skilled in the art will appreciate that such embodiments are provided for illustrative purposes and do not limit subject matters disclosed in the detailed description and appended claims. Therefore, it will be apparent to those skilled in the art that various alterations and modifications of the embodiments are possible within the scope and spirit of the present invention and duly included within the appended claims.

The conventional battery pack has a plurality of battery cells connected to each other in series or in parallel to provide a voltage in a required range and battery capacity, and may include a battery management system hereinafter, referred to as a BMS, a safety switch such as a fuse and a relay, and the like. Furthermore, a battery module is provided with a connector for measuring voltage values of each of the battery cells. A wiring harness for transferring measurement signals of the voltage values of each of the battery cells to the BMS may be included. Control equipment, a controller, and electronic parts, or the like are housed in designated regions of the battery pack. Protective structures configured to protect the parts are formed for the respective parts. The protective structures such as a protector, a partition, a cover, and the like are disposed in the battery pack. Therefore, as the number of parts increases, a volume and a weight of the battery pack increases and the number of assembling processes also increases.

Figure 1:
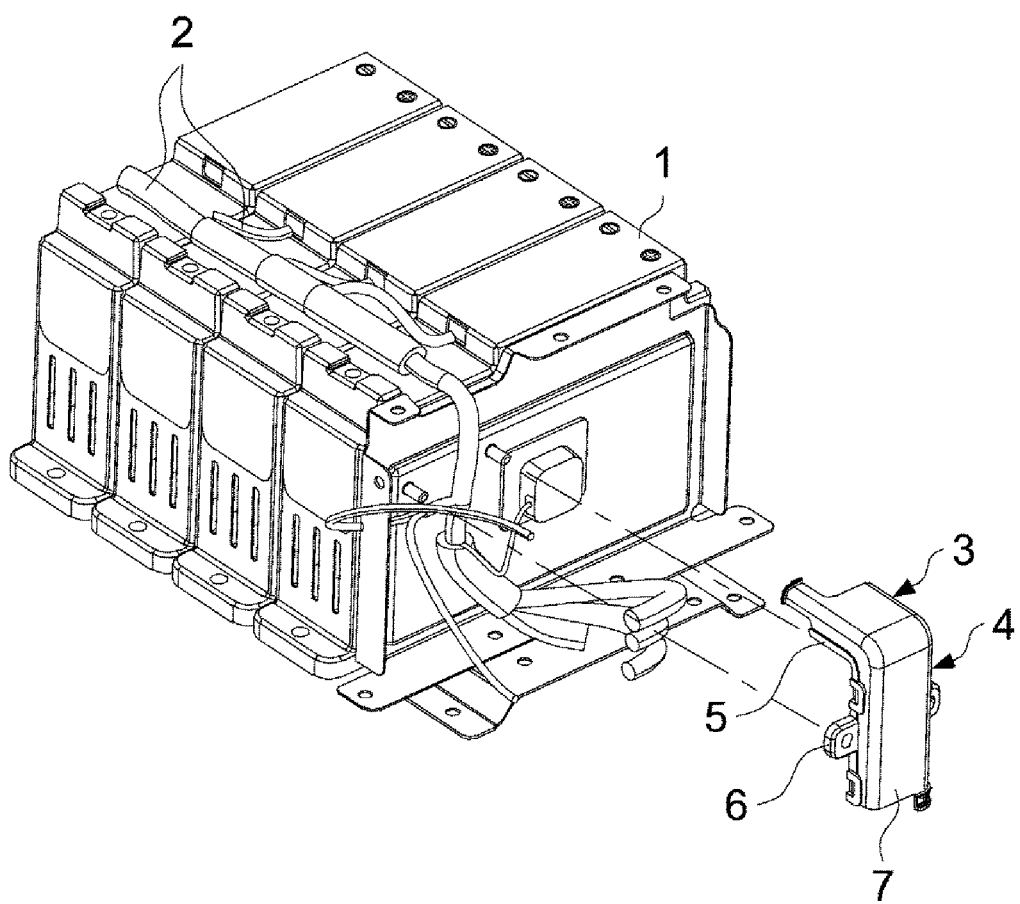
FIG. 1 is a perspective view showing a conventional battery module.
Figure 2:
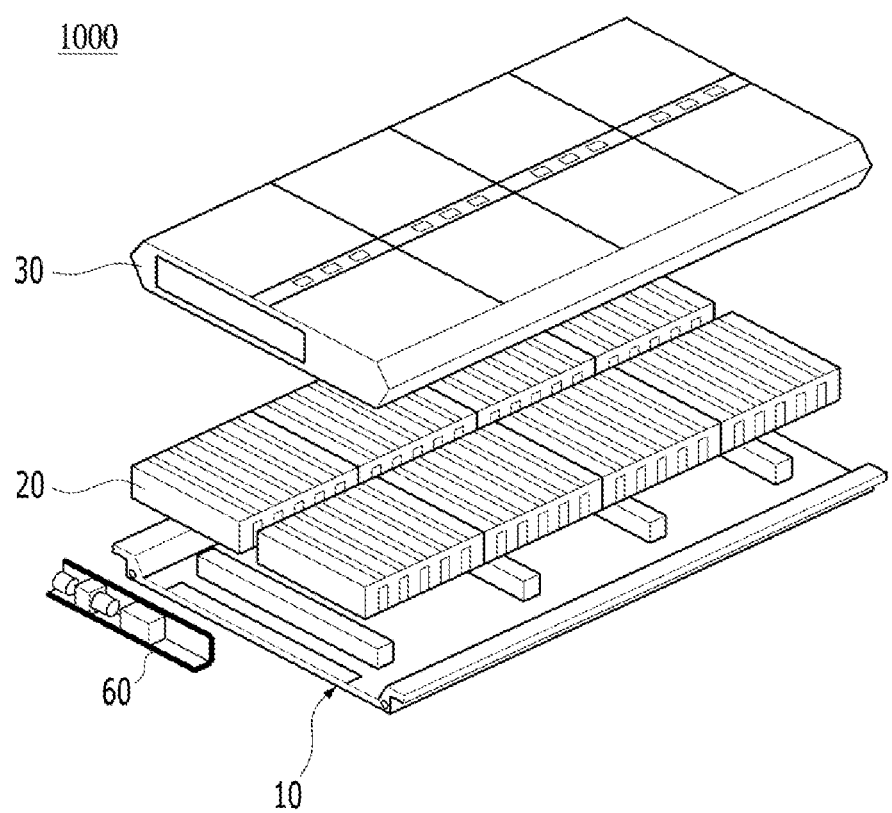
FIG. 2 is an exploded perspective view schematically illustrating a secondary battery pack according to an embodiment of the present invention.

FIG. 2 is an exploded perspective view showing a secondary battery pack 1000 according to an embodiment of the present invention. Referring to FIG. 2, the secondary battery pack 1000 according to an embodiment of the present invention may integrate various parts into a single body to simplify the structure of the secondary battery pack. The secondary battery pack 1000 according to the embodiment of the present invention may include a first structure 10, secondary battery modules 20, and a second structure 30.

The first structure 10 is an integration structure in which a cover, a cooling system, and a vehicle mounting structure are integrated. The first structure 10 may serve as a cooling support structure. The second structure 30 is an integration structure in which a printed circuit board including the BMS and a sensing module, the wiring harness thereof, and the cover are integrated. The second structure 30 may serve as a multi-functional structure. The secondary battery module 20 includes a battery cell 210 (shown in FIG. 7) and cooling fins 220 (shown in FIG. 7). The secondary battery modules 20 are mounted between the first structure 10 and the second structure 30 to form one secondary battery pack 1000. That is, in the secondary battery pack 1000, the first structure 10 may serve as the cooling support structure, and the second structure 30 may serve as the multi-functional structure.

The secondary battery pack 1000 may reduce the number of parts and the number of assembling processes due to the first structure 10, the secondary battery module 20, and the second structure 30, in which several structures are integrated. Without compromising the functions of the integrated parts, the number of assembling bodies may be reduced. Furthermore, since the number of duplicated parts is reduced, the secondary battery pack may be compact in size. As the size and the weight are reduced, higher power may be obtained within a given weight.

Figure 3:
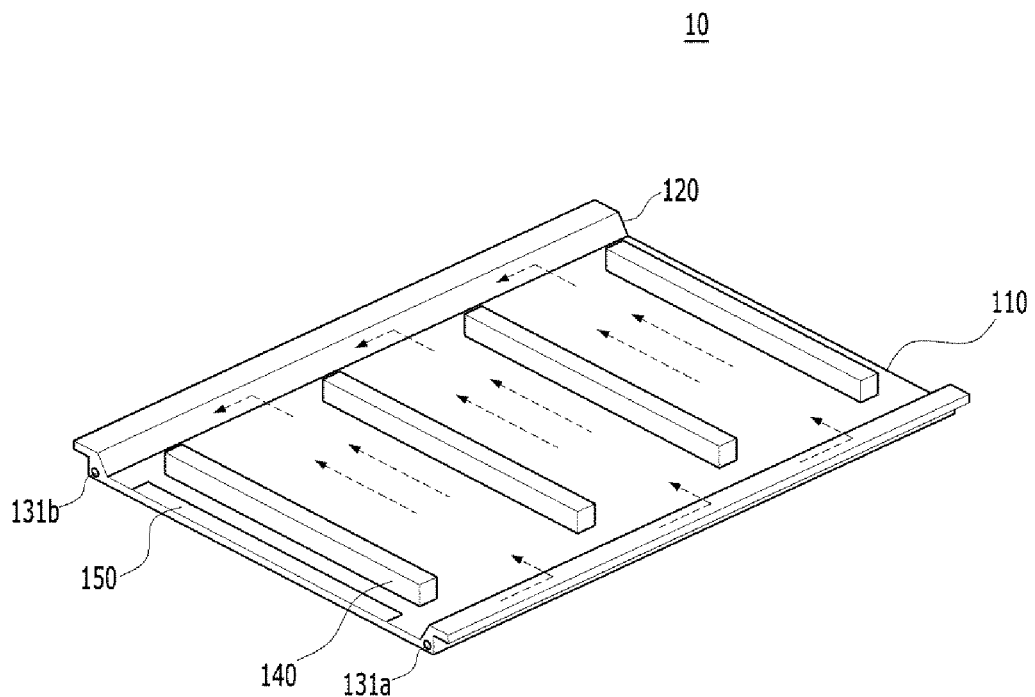
FIG. 3 is a perspective view illustrating a first structure according to an embodiment of the present invention.

FIG. 3 is a perspective view showing the first structure 10 according to an embodiment of the present invention. Referring to FIG. 3, the first structure 10 is formed in a first (one) side cover shape and may be mounted on one side (for example, upper side) of the secondary battery module 20. In the first structure 10, a cooling channel and a bracket that may be fixedly mounted in a vehicle are integrated. The first structure 10 may include a plate 110 and side structures 120.

The plate 110 may be formed by extrusion or press processing. For example, the plate 110 may be formed by extruding an aluminum material. The plate 110 may be formed in a rectangular plate shape. The shape of the plate 110 may be determined in consideration of a size and a shape of the secondary battery module 20. For example, when the secondary battery module 20 is a pouched type, the plate 110 may be in a rectangular plate shape. When the secondary battery module 20 is a cylinder type or a prismatic type, the plate 110 may have a shape fitting to or compatible with secondary battery module shape. The secondary battery module 20 may be positioned on a surface of the plate 110 such that the plate 110 may support the secondary battery module 20. In addition, the first structure 10 is formed in a shape corresponding to the secondary battery module 20, and may cover a side of the secondary battery module 20. Therefore, the first structure 10 may support and protect the secondary battery module 20.

The side structures 120 may be provided on both sides of the plate 110 and arranged symmetrical to each other. The side structures 120 may be coupled to both sides of the plate 110. The side structures 120 and the plate 110 may be coupled by various coupling methods such as bolting, riveting, welding, brazing, or the like. In addition, the side structures 120 may be integrated with the plate 110. The side structures 120 may serve as a bracket so that the secondary battery pack 1000 can be mounted in the vehicle. That is, the side structures 120 may have various shapes depending on a vehicle model and may be changed or replaced depending on the vehicle model. Furthermore, the side structures 120 may be provided with one or more holes (not shown), and the holes may reduce the weight of the side structure 120. Since the side structures 120 are provided in a length direction of the plate 10, the side structures 120 may provide structural rigidity to the plate 110 in the length direction. The weight of the secondary battery module 20 mounted on an upper surface of the plate 110 may prevent the plate 110 from being bent in the length direction. Furthermore, the side structures 120 may include bolt holes (not shown) which are used to fasten the second structure 30 after the secondary battery module 20 is mounted.

The first structure 10 may include a cooling structure. That is, the side structure 120 may be provided with an inflow channel 131a, into which a coolant is introduced, on one side, and an outflow channel 131b, from which the coolant is discharged, on the other side. The plate 110 may be provided with a cooling channel 132 (see FIG. 4) in which the coolant flows.

Figure 4:
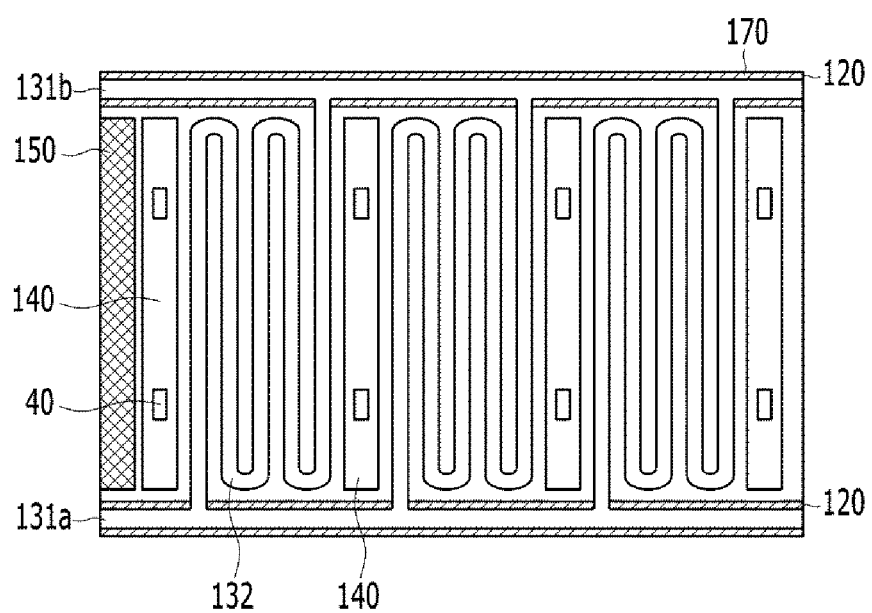
FIG. 4 is a cross-sectional view illustrating the first structure, shown in FIG. 3, with a cooling structure.

FIG. 4 is a cross-sectional view illustrating the first structure 10 shown in FIG. 3. The cooling structure is formed in the first structure 10. Referring to FIG. 4, as described above, the first structure 10 may include the cooling structure. The coolant is introduced through the inflow channel 131a from one side of the side structure 120 and may flow in the cooling channel 132 formed in the plate 110. The cooling channel 132 may transfer for example, conduction transfer by contact, cold air obtained by heat exchange between ambient air and the coolant to the secondary battery module 20. Therefore, heat generated from the secondary battery module 20, which is mounted on the plate 110 and in contact with the plate 110, is cooled by the coolant flowing along the cooling channel 132 through the heat exchange. The coolant passing through the cooling channel 132 of the plate 110 may be discharged to the discharge channel 131b. Therefore, the heat of the secondary battery module 20 may be cooled by the coolant flowing through the cooling channel 132. Since the first structure 10 includes the cooling channel 132 integrally formed therewith, the secondary battery module 20 may be effectively cooled without an additional cooling structure on an upper side or a lower side of the first structure 10.

Moreover, instead of forming the cooling channel in the plate 110, the plate 110 may include a heat sink, or the like near the secondary battery module 20.

Furthermore, peripheral areas of the inflow channel 131a and the outflow channel 131b, which are provided in the side structures 120, may be sealed by sealing members 170. By preventing the coolant from being leaked from the channel, a damage of the secondary battery module 20 due to the leakage of the coolant may be prevented.

Figure 5:
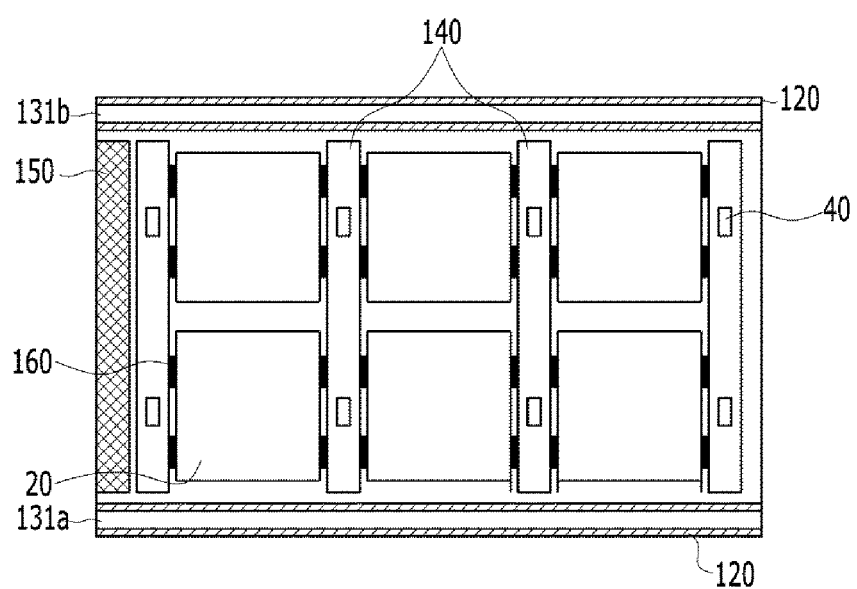
FIG. 5 is a cross-sectional view illustrating the first structure, shown in FIG. 4, with secondary battery modules.

As illustrated in FIGS. 3 to 5, the plate 110 of the first structure 10 may include stepped portions 140 and a placing portion 150. The stepped portions 140 may be formed on the plate 110 and arranged at a predetermined interval from each other. The predetermined interval may be set corresponding to a width of the secondary battery module 20. Specifically, since the secondary battery module 20 is disposed between the two stepped portions 140 arranged at a predetermined interval, the predetermined interval may be set to correspond to the width of the secondary battery module 20. This feature will be described below in more detail. The stepped portion 140 may extend from one side structure 120 of the plate 110 to the other side structure 120.

Switch parts 60 may include a relay, a fuse, and the like and may be placed on the placing portion 150. The placing portion 150 may be formed at one end portion of the upper surface of the plate 110. The placing portion 150 may include the switch part 60.

FIG. 5 is a cross-sectional view illustrating the first structure 10 according to an embodiment of the present invention. In FIG. 5, the secondary battery modules 20 is mounted on the first structure 10. Referring to FIG. 5, as described above, the stepped portions 140 may be disposed on the plate 110 of the first structure 10 at the predetermined interval. Since the stepped portions 140 are formed on the upper surface of the plate 110, the plate 110 may have enhanced structural rigidity. Since the stepped portions 140 are provided in a width direction of the plate 110, it is possible to prevent the plate 110 from being bent in the width direction due to a weight of the secondary battery modules 20 which is mounted on one surface of the plate 110. The stepped portion 140 may be provided with bus bars 40. The bus bars 40 have a predetermined length and are disposed between electrode tabs 211 (referring to FIG. 5) of the battery cell 210 to connect the electrode tabs 211 with each other. The stepped portions 140 may be a mounting point for mounting the secondary battery modules 20. Furthermore, the stepped portions 140 may provide a step between the secondary battery modules 20.

The stepped portion 140 may be the mounting point, serve as a support member for fixing the secondary battery module 20, and may be a structure for mounting the bus bar 40. Therefore, the first structure 10 according to an embodiment of the present invention may reduce the number of fastening means used for fastening the parts.

The secondary battery module 20 may be mounted between the stepped portions 140. Although not shown in the drawings, the secondary battery module 20 may further include an expandable pad. The expandable pad has flexibility and is provided between the battery cells 210 (referring to FIG. 5) in the secondary battery modules 20. Thus, the secondary battery module 20 may have predetermined flexibility. Therefore, when the secondary battery module 20 is mounted between the two stepped portions 140, the expandable pad of the secondary battery module 20 may be compressed and positioned between the two stepped portions 140. Therefore, a length of the width of the secondary battery module 20 corresponds to an interval between the stepped portions 140, and may have a range equal to or slightly longer for example, in a range of 0.1 mm to 1 mm, than the interval between the stepped portions 140 so that the expandable pad may be inserted when compressed. Further, the secondary battery module 20 may also be fixed to the stepped portions 140 by additional fastening members 160 such as bolts. The fastening member 160 may prevent a separation of the secondary battery module 20 from the first structure 10, for example, a separation of the secondary battery module 20 from the first structure 10 in a direction perpendicular to the upper surface of the plate 110. The stepped portions 140 may fix the secondary battery module 20 to the first structure 10 while defining a region for mounting the secondary battery module 20. However, it is not limited thereto. In another embodiment, the expandable pad may be positioned in the stepped portion 140 or the stepped portion 140 may have flexibility.

The placing portion 150 serves as a space in which the switch parts 60 may be placed. The switch parts 60 may include the relay, the fuse, and the like. The switch part 60 attached to the secondary battery module 20 may be placed on the placing portion 150 while the secondary battery module 20 is mounted on the upper side of the first structure 10. The placing portion 150 includes a hole or a lid member through which the parts placed on the placing portion 150 can be replaced with another part even after the secondary battery pack 1000 is assembled.

Figure 6A:
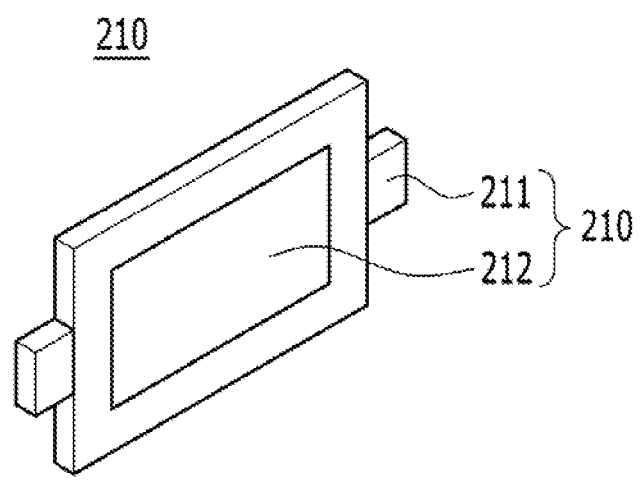
FIG. 6A is a perspective view illustrating a battery cell and FIG. 6B is an exploded view illustrating portion of secondary battery module according to an embodiment of the present invention.
Figure 6B:
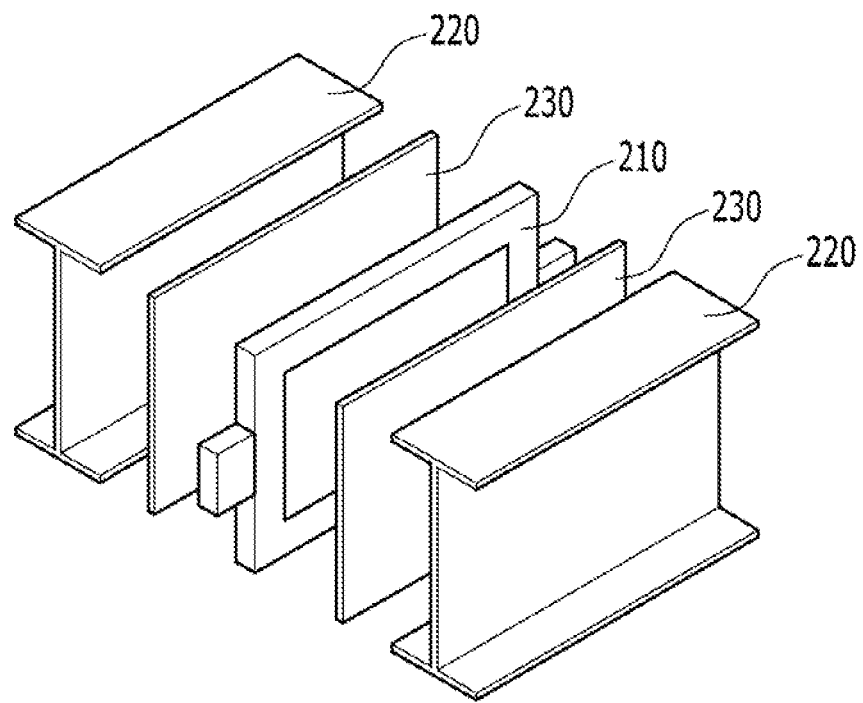

FIG. 6 illustrates perspective views showing a configuration of the secondary battery module 20 according to an embodiment of the present invention. In particular, FIG. 6A is a perspective view illustrating a battery cell and FIG. 6B is a exploded view illustrating portion of secondary battery module according to an embodiment of the present invention.

The secondary battery module 20 according to an embodiment of the present invention may include a plurality of battery cells 210 and a plurality of cooling fins 220.

Referring to FIG. 6A, the battery cell 210 may include electrode tabs 211. The electrode tabs 211 may be formed at one side end or both side ends of a battery cell body 212. The electrode tab 211 may be formed in a pair, including a cathode tab and an anode tab. For example, the cathode tab and the anode tab may be formed at both side ends of the battery cell body 212, respectively. Alternatively, both of the cathode tab and the anode tab may be formed at the same side end of the battery cell body 212. Hereinafter, as a non-limited embodiment, a configuration will be described in which the cathode tab and the anode tab are formed at both side ends of the battery cell body 212, respectively.

Referring to FIG. 6B, the cooling fin 220 is disposed between the plurality of battery cells 210 that are disposed apart from each other at a given interval. The adhesive pad 230 may be disposed between the battery cell 210 and the cooling fin 220 to couple or bond the battery cell 210 and the cooling fin 220 to each other. The electrode tabs 211 of the battery cells 210 may be connected to each other in series or in parallel.

Figure 7:
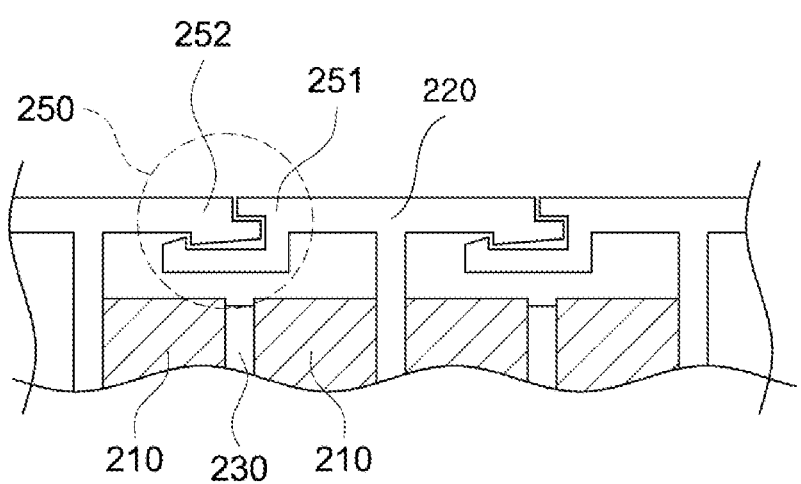
FIG. 7 is an enlarged cross-sectional view illustrating a snap-fit structure according to an embodiment of the present invention.

FIG. 7 is an enlarged cross-sectional view illustrating a snap-fit 250 structure, which couples the cooling fins 220 to each other, according to an embodiment of the present invention. The cooling fin 220 may be formed in various shapes such as in an "I" shape, in a "T" shape, in a "U" shape, and the like. The secondary battery module 20 may have a configuration in which a plurality of cooling fins 220 are arranged, and the battery cell 210 is disposed between the cooling fins 220. To couple the plurality of cooling fins 220 to each other, the cooling fins 220 may be provided with a snap-fit 250 structure. To describe the snap-fit 250 structure, for example, the cooling fin 220 having the "I" shape will be described below, but the shape of the cooling fin 220 is not limited thereto.

Referring to FIG. 7, the cooling fin 220 has an I-shaped cross section and a longitudinal direction, and the battery cells 210 are positioned on both sides of the cooling fin 220 in a length direction that is, on both sides of the I-shaped cross section. The cooling fins 220 are continuously arranged in a lateral direction, and the battery cells 210 may be disposed between the cooling fins 220 to form one secondary battery module 20. In this case, the adjacent cooling fins 220 may be fastened to each other by one or more snap-fit 250 structures which are formed in at least one of the upper and lower portions of the adjacent cooling fins 220 when viewed from the "I"-shaped cross section. The snap-fit 250 has male and female fitting pieces which are positioned to face each other and couple with each other in a snap fitting manner. The male fitting piece of a pair of snap-fit snaps-fits 250 may include a hook-shaped locking protrusion 251, and the female fitting piece may include a locked portion 252 to which the hook-shaped locking protrusion 251 is fitted and locked. The locking protrusion 251 and the locked portion 252 are fastened to each other and couple the adjacent cooling fins 220 to each other, thereby preventing the cooling fins 220 from being separated from each other.

The snap-fit 250 structure may prevent the battery cell 210 from being separated from cooling fins 220 even when repetitive vibrations are applied to the battery cell 210 while the battery cell 210 is positioned within the cooling fins 220. For example, vibrations of a vehicle may be repetitively applied to the battery cell 210 when the battery cell 210 is mounted in the vehicle. However, the shape of the cooling fin 220 is not limited to the structure having the I-shaped cross section. The cooling fin may be formed in any shape so long as it may cool down and house the battery cells 210.

Figure 8:
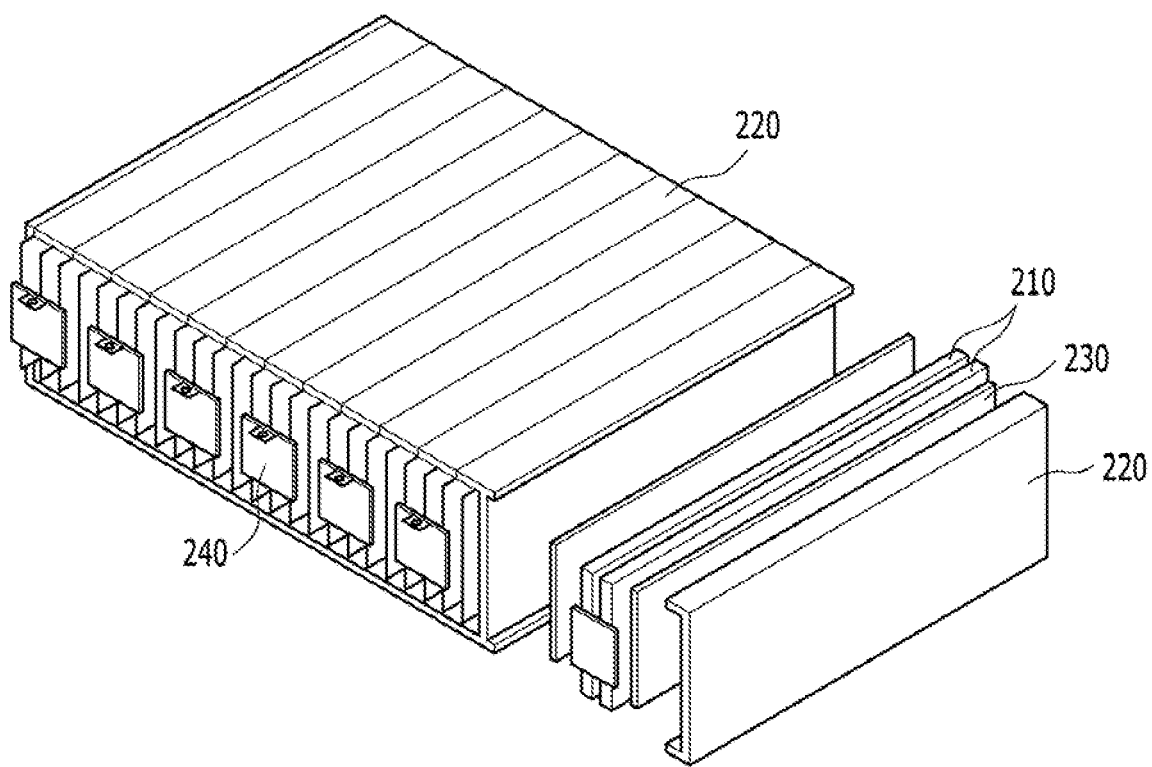
FIG. 8 is a perspective view illustrating a structure of the secondary battery module according to an embodiment of the present invention.

FIG. 8 is a perspective view illustrating the secondary battery module 20 according to an embodiment of the present invention. The secondary battery module 20 according to an embodiment of the present invention may integrate various types of parts. In the secondary battery module 20 according to an embodiment of the present invention, the cooling fin 220 may also serve as a housing case. Thus, no separate case is necessary to be provided on the battery cell 210.

Referring to FIG. 8, the secondary battery module 20 includes the battery cells 210 and the cooling fins 220. The plurality of battery cells 210 may be disposed apart from each other at a first interval and the cooling fin 220 may be disposed between the adjacent battery cells 210 at the same interval as the first interval. Specifically, the cooling fin 220 is disposed between the battery cells 210 and extends to the upper and lower ends of the battery cells 210 for protecting the battery cells 210 and cooling the battery cells 210. Therefore, the cooling fin 220 may serve as a cooling structure and serve as a case for housing the battery cell 210 at the same time.

To couple the battery cell 210 with the cooling fins 220, the adhesive pad 230 may be provided between the battery cell 210 and the cooling fins 220. The adhesive pad may be disposed between the battery cell 210 and the cooling fin 220 to attach the battery cell 210 and the cooling fin 220 to each other. Therefore, the secondary battery module 20 may have a minimum number of components and does not require a separate connection structure. The plurality of battery cells 210 and cooling fins 220 may be integrated to form the secondary battery module 20.

The secondary battery module 20 may include one or more terminal bus bars 240 that may electrically connect the plurality of battery cells 210 to each other to measure a voltage. The terminal bus bar 240 may contact a contact terminal piece 331 of a printed circuit board assembled in the second structure 30 shown in FIGS. 10 and 11 without a separate connector to measure a voltage. The printed circuit board assembled in the second structure 30 may perform BMS and sensing functions, which will be described in detail below.

Replaceable parts such as the switch part 60 including the relay and the fuse may be mounted on one side of the secondary battery module 20. The switch part 60 mounted on one side of the secondary battery module 20 may be placed on the placing portion 150 of the first structure 10. Accordingly, when there is a need to replace parts such as the relay and the fuse, the parts may be simply replaced by replacing only the placing portion 150 of the first structure 10, thereby more efficiently performing maintenance operations such as a replacement of parts.

In the secondary battery module 20 according to the present invention, due to the arrangement of the cooling fin 220, the cooling fin 220 also serves as an exterior of the secondary battery module 20. Therefore, the conventional structure such as the cover structure and the support structure of the battery module may be simplified to reduce the number of duplicated structures.

Figure 9A:
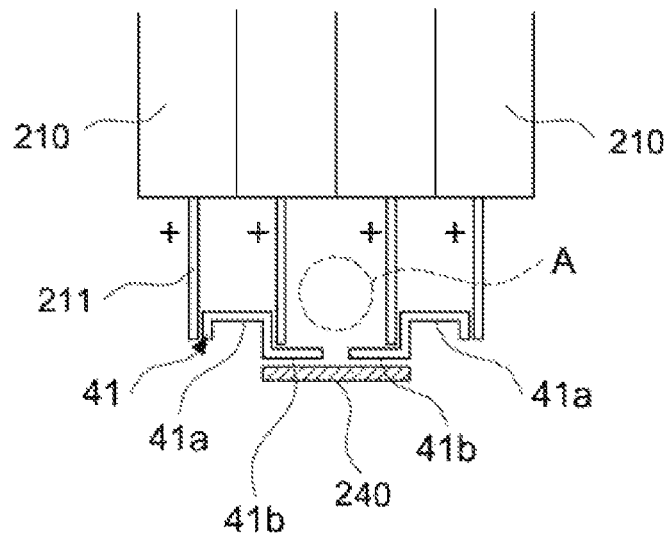
FIGS. 9A and 9B are cross-sectional views illustrating a terminal bus bar according to an embodiment of the present invention.
Figure 9B:
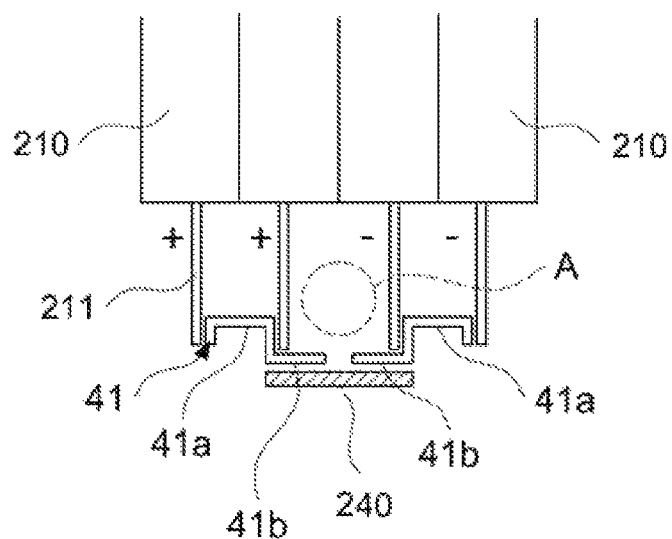

FIGS. 9A and 9B are cross-sectional views showing the terminal bus bar 240 for connecting the electrode tabs 211 according to an embodiment of the present invention. Referring to FIGS. 9A and 9B, the battery cell 210 may include the electrode tabs 211. The electrode tab 211 may include the cathode tab and the anode tab. The electrode tabs 211 may be connected to each other in series or in parallel. FIG. 9A shows that the electrode tabs 211 having same polarities (for example, (+) polarity in FIG. 9A) are connected to each other in a parallel connection, and FIG. 9B shows that a pair of electrode tabs 211 having one polarities (for example, (+) polarity in the left side of FIG. 9B) are connected to a pair of electrode tabs 211 having the other polarities (for example, (−) polarity in the right side of FIG. 9B) by combination of series and parallel. The secondary battery module 20 may include the terminal bus bar 240 configured to electrically connect the plurality of battery cells 210 with each other. Specifically, the electrode tabs 211 may be connected by the terminal bus bar 240. Terminal portions 41 may be provided for connecting the electrode tabs 211 to each other using the terminal bus bar 240.

Furthermore, since the cooling fin 220 serves as an exterior of the battery cell 210, protective structures may be removed, and thereby an interval between the battery cells 210 may be narrowed. In this case, in order to connect the battery cells 210 using the terminal bus bar 240 with the interval between the battery cells 210 being narrowed, the terminals 41 may be disposed. The secondary battery module 20 according to an embodiment of the present invention includes the terminal unit that may connect the electrode tabs 211 of the adjacent electrode cells 210 to each other. The terminal unit 41 may include a contact terminal 41a disposed between the electrode tabs 211 of the adjacent battery cells 210 to contact the electrode tabs 211 and a wing terminal 41b extended from the contact terminal 41a toward the outsides of the electrode tabs 211.

In more detail, the terminal unit 41 may contact the cathode electrode tab 211 extending out from one the battery cells 210 and the anode electrode tabs 211 extending out from the battery cell 210.

The terminal unit 41 may include the contact terminal 41a and the wing terminal 41b. The contact terminal 41a is disposed between the cathode and anode electrode tabs 211, which are led out from each of one battery cells 210 and the battery cells 210, respectively, so that the cathode tab 211 and anode electrode tab 211 contact each other. The wing terminal 41b extends outwardly from one end of the contact terminal 41a.

The contact terminal 41a may be formed in a U shape and may contact the cathode and anode electrode tabs 211 which are respectively led out from the battery cells 210 adjacent to each other. The wing terminal 41b may extend outwardly from one end of the contact terminal 41a having the U shape. Two wing terminals 41b adjacent to each other may form as a pair and face each other in a length direction. That is, the wing terminal 41b of the terminal unit 41 may be positioned to face the wing terminal 41b of another terminal unit 41 adjacent to the terminal unit 41. The terminal bus bar 240 which is coupled to the wing terminal 41b may be provided on outsides of the pair of wing terminals 41b. The adjacent battery cells 210 may be electrically connected to each other by the terminal bus bar 240 which is coupled with the pair of wing terminals 41b. That is, the terminal unit 41 disposed at the adjacent battery cells 210 among the plurality of battery cells 210 may be provided with the terminal bus bar 240 to electrically connect the adjacent battery cells 210 with each other.

The terminal bus bar 240 formed as described above may contact a contact terminal piece 331 mounted on a printed circuit board 330 to measure a voltage of the battery cells 210, which will be described in detail below with reference to FIG. 11.

Furthermore, a jig insertion space A, into which a jig is inserted for welding, may be provided between the wing terminals 41*b* that are disposed to face each other in a direction toward the battery cell 210. In another embodiment, a jig insertion space A, into which a jig is inserted for welding, may be defined by (i) two battery cells 210 which are adjacent to each other, (ii) the wing terminals 41*b* which face each other, and (iii) two electrode tabs 211. The jig may be inserted into the jig insertion space A and welded without a separate component for welding. When the welding is completed, the jig may be removed from the jig insertion space A.

The secondary battery module 20 is located in the second structure 30. The terminal bus bar 240 of the secondary battery module 20 and the contact terminal piece 331 of the second structure 30 may contact each other to measure a voltage, which will be described in detail below.

FIGS. 9A and 9B illustrates the electrode tabs 211 are connected to each other in series or in a parallel connection. However, the embodiment of the present invention is not limited thereto. The electrode tabs 211 may be connected to each other in various ways (for example, three battery cells may be connected to one another in a parallel connection, and three sets of battery cells connected in a parallel connection may be connected to one another in series (3P3S)).

Figure 10A:
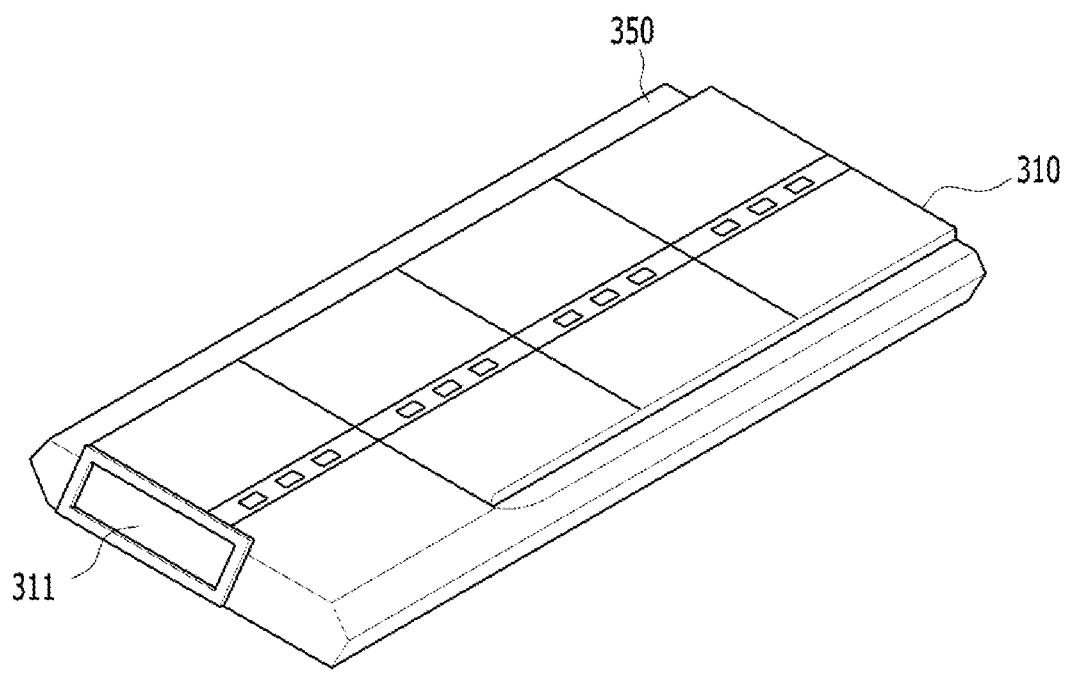
FIG. 10A is a perspective view illustrating a front side of the second structure and FIG. 10B is a perspective view illustrating a back side of the second structure according to an embodiment of the present invention.
Figure 10B:
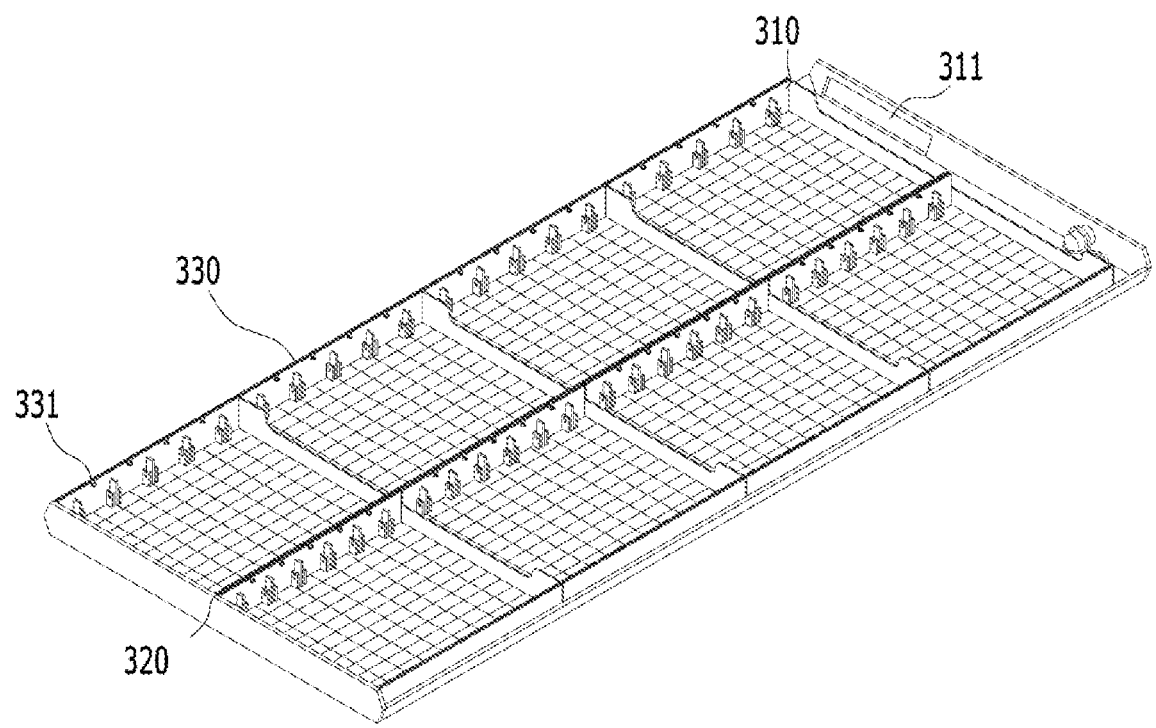

FIG. 10A is a perspective view illustrating a front side of the second structure and FIG. 10B is a perspective view illustrating a back side of the second structure according to an embodiment of the present invention. Referring to FIGS. 10A and 10B, the second structure 30 is formed in a second (the other) side cover shape (for example, lower side) and may be mounted over the other side of the secondary battery module 20. In the second structure 30, the printed circuit board and the wiring harness are integrated into one unit. In detail, the protective structures for the BMS, the sensing module, and the wiring harness are integrated into a single body. The protective structures of various parts are combined and integrated into the second structure 30. Furthermore, the second structure 30 may also serve as a cover. Specifically, the second structure 30 is a structure covers, and protects for protecting electronic parts, such as a case of a module, a partition, a wiring harness case, a BMS case, an upper cover of a pack, and a relay case are integrated in one large injection part.

The second structure 30 according to an embodiment of the present invention may be formed using a large plastic injection mold. The second structure 30 is formed in a shape corresponding to the secondary battery module 20 and may cover the other side of the secondary battery module 20. Therefore, the second structure 30 may support the secondary battery module 20 and protect the secondary battery module 20 from vibrations or impacts.

Furthermore, the second structure 30 may include the printed circuit board 330 on which the BMS and the sensing module are mounted. That is, the second structure 30 may include a measurement control circuit. The measurement control circuit includes the BMS and the sensing module which may measure and control the power of the secondary battery module 20.

Furthermore, the housing 310 of the second structure 30 may include an opening 311. The opening 311 is formed in one side of the second structure 30. The housing 310 may be formed in such a shape so that only one surface of housing 310 which is coupled to the secondary battery module 20 is opened. In addition, to couple the secondary battery module 20 to the first structure 10, the housing 310 may be formed in a shape corresponding to the first structure 10 and the secondary battery module 20.

The housing 310 may have the opening 311 to facilitate the replacement of the switch part 60 mounted in the secondary battery module 20. The opening 311 is formed to conveniently replace the switch part 60, which include the relay, the fuse, and the like and is mounted at one side of the secondary battery module 20, with another switch part. Typically, the parts such as the relay and the fuse need to be replaced in the battery pack. The opening 311 may be formed to more conveniently replace parts. The opening part 311 may be formed at a place corresponding to the position of the switch part 60. Therefore, the opening 311 may be formed at a place corresponding to the position of the placing portion 150 which is formed in the first structure 10. The opening 311 may be further provided with a cover member (not shown) that may be opened and closed to safely protect the parts. Therefore, the parts disposed on the placing portion 150 may be conveniently replaced.

Furthermore, a fastening portion 350 of the housing 310 may have a fastening structure which couples to the first structure 10. The fastening structure may be fastened with the side structure 120 of the first structure 10.

The housing 310 of the second structure 30 may have the opening 311 in one side face thereof to facilitate the replacement of the switch part 60 mounted in the secondary battery module 20. The opening 311 is formed to conveniently replace the switch part 60, which include the relay, the fuse, and the like and is mounted on one side of the secondary battery module 20. Typically, the parts such as the relay and the fuse need to be replaced in the battery pack. The opening potion 311 may facilitate access to the parts to be replaced. The opening part 311 may be formed at a place corresponding to the position at which the switch part 60 is positioned. Therefore, the opening 311 may be formed at a place corresponding to the placing portion 150 which is formed in the first structure 10. The opening 311 may further include a cover member (not shown) that may be opened and closed to safely protect parts. Therefore, the parts disposed on the placing portion 140 may be conveniently replaced with new parts.

Furthermore, the housing 310 may have the fastening structure and be coupled to the first structure 10. The fastening structure may be fastened to the side structure 120 of the first structure 10.

Figure 11:
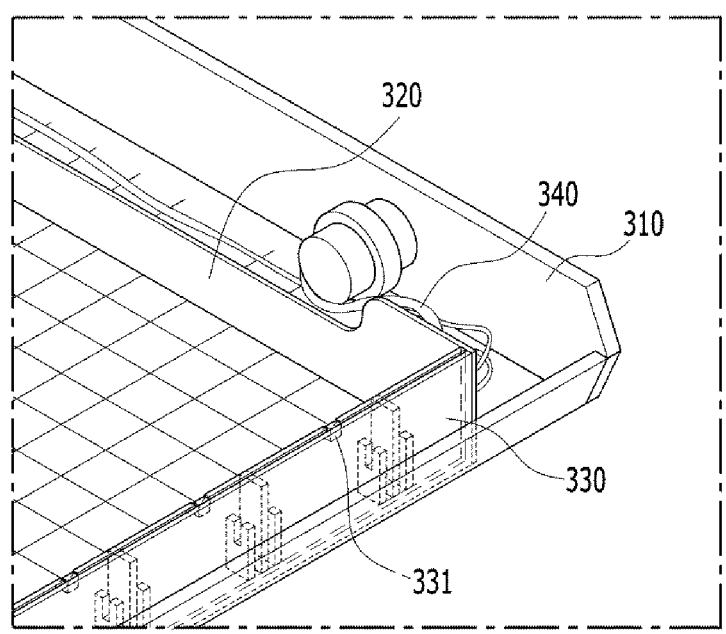
FIG. 11 is an enlarged perspective view illustrating a second structure according to an embodiment of the present invention.

FIG. 11 is an enlarged perspective view illustrating the second structure 30 according to an embodiment of the present invention. Referring to FIG. 11, the second structure 30 includes the printed circuit board 330 forming various types of control circuits and may include a barrier 320 in which the printed circuit board 330 is mounted. The printed circuit board 330 may be disposed between the barrier 320 and the housing 310 or between the barrier 320 and another barrier 320.

The printed circuit board 330 may serve as the BMS and the sensing module. Specifically, the printed circuit board 330 uses the BMS and the sensing portion to read a signal and control the secondary electronic pack 1000. The printed circuit board 330 uses the contact terminal piece 331 to measure a voltage without a separate welding and the connector connection.

The barrier 320 may be formed to mount the printed circuit boards 330 forming various types of control circuits. The printed circuit board 330 may be formed in the barrier 320 while securing the minimum power. The printed circuit board 330 including the BMS and sensing module functions may be disposed between the housing 310 and the barrier 320. The secondary battery module 20 may be mounted inside the barrier 320. As a result, it is possible to mount the secondary battery module 20 and protect the printed circuit board 330 without a separate case. Furthermore, the barrier wall 320 may include a groove so that the contact terminal piece 331 mounted on the printed circuit board 330 protrudes toward the inside of the barrier 320.

The printed circuit board 330 may include the contact terminal piece 331 that contacts the terminal bus bar 240 of the secondary battery module 20 to measure a voltage. Specifically, the printed circuit board 330 includes the contact terminal piece 331, which is made of an elastic member such as a spring. Thus, the contact terminal piece 331 may be expanded and contracted. The terminal bus bar 240 and the contact terminal piece 330 may contact each other while the secondary battery module 20 and the second structure 30 are separated from each other and may be stacked over and coupled to each other.

When the secondary battery module 20 is mounted on the second structure 30, in order to prevent the contact terminal piece 331 protruding toward the inside of the second structure 30 from being damaged, the contact terminal piece 331 may be made of the elastic member having an elastic force. Accordingly, when the secondary battery module 20 and the second structure 30 are coupled to each other, the terminal bus bar 240 and the contact terminal piece 330 may more stably contact each other. Furthermore, a wiring harness 340 led out from the printed circuit board 330 may be disposed between the housing 310 and the barrier 320. As a result, it is possible to protect the printed circuit board 330, the wiring harness 340, and the like without a separate protective structure. Furthermore, since the contact terminal piece 331 and the terminal bus bar 240 directly contact each other to measure a voltage, a separate connector is not required.

As a result, the secondary battery module 20 made of aluminum is mounted in the first structure 10, and then the second structure 30 is mounted on the secondary battery module 20 to form the secondary battery pack 1000. The first structure and the second structure 30 may protect and support the secondary battery module 20. The first structure 10 and the second structure 30 are fastened to each other by the fastening structure such as a bolt, thereby forming one secondary battery pack 1000. However, a stacking order of the first structure 10, the secondary battery module 20, and the second structure 30 is not limited thereto.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the above-described embodiments, but be defined by the appended claims as well as equivalents thereof.

What is claimed is:
1. A secondary battery pack, comprising:
a plurality of secondary battery modules including battery cells and cooling fins;
a first structure provided under the plurality of secondary battery modules and including a cooling channel; and
a second structure provided over the plurality of secondary battery modules and coupled to the first structure such that the plurality of secondary battery modules are disposed therein, the second structure including a printed circuit board,
wherein the first structure further includes:
a plate having the cooling channel formed therein;
a bracket extending along a first side of the plate configured to provide longitudinal rigidity of the plate; and
stepped parts formed over the plate configured to provide rigidity in the width direction of the plate perpendicular to the longitudinal direction and disposed apart from each other,
wherein the stepped parts are configured to partition the plurality of secondary battery modules into at least two and mount the partitioned plurality of secondary battery modules therebetween.
2. The secondary battery pack of claim 1,
wherein the cooling channel includes an inflow channel and an outflow channel,
wherein a coolant is introduced into the inflow channel and discharged from the outflow channel,
wherein the inflow channel is formed along a second side of the plate, and
wherein the outflow channel is formed along a third side of the plate.
3. The secondary battery pack of claim 1,
wherein a placing portion is defined along a fourth side of the plate,
wherein a switch member is provided in the placing portion, and
wherein the switch member includes a relay, a fuse, or both.
4. The secondary battery pack of claim 3,
wherein the second structure includes an opening, and
wherein the opening is formed directly over the placing portion, so that the switch member is replaceable through the opening.
5. The secondary battery pack of claim 1,
wherein the cooling fins are spaced apart from each other at a first interval, and
wherein each of the battery cells are disposed between the cooling fins.
6. The secondary battery pack of claim 5,
wherein each of the cooling fins includes an upper extension and a lower extension,
wherein the plurality of secondary battery modules, the first structure, and the second structure are stacked in a first direction,
wherein each of the cooling fins extends in the first direction,
wherein the upper extension extends from a top of each of the cooling fins in a second direction,
wherein the lower extension extends from a bottom of each of the cooling fins in the second direction,
wherein the upper extension is coupled to a neighboring upper extension to form an upper exterior of the plurality of secondary battery modules, and
wherein the lower extension is coupled to a neighboring upper extension to form a lower exterior of the plurality of secondary battery modules.

7. The secondary battery pack of claim 1,
wherein the plurality of secondary battery modules further include a terminal bus bar and electrode tabs,
wherein each of the electrode tabs extends from each of the battery cells,
wherein the terminal bus bar electrically connects the electrode tabs to each other, and
wherein the terminal bus bar contacts the printed circuit board.

8. The secondary battery pack of claim 1,
wherein the plurality of secondary battery modules further include a terminal unit and first and second electrode tabs,
wherein the battery cells include first and second battery cells,
wherein the first and the second electrode tabs extend from the first and the second battery cells, respectively,
wherein the terminal unit includes a first contact terminal and a first wing terminal,
wherein the first contact terminal is disposed between the first and the second electrode tabs and connects the first and the second electrode tabs to each other, and
wherein the first wing terminal extends outwardly from the first contact terminal.

9. The secondary battery pack of claim 8,
wherein the plurality of secondary battery modules further include third and fourth electrode tabs,
wherein the battery cells include third and fourth battery cells,
wherein the third battery cell is located next to the second battery cell,
wherein the third and the fourth electrode tabs extend from the third and the fourth battery cells, respectively,
wherein the terminal unit further includes a second contact terminal and a second wing terminal,
wherein the second contact terminal is disposed between the third and the fourth electrode tabs and connects the third and the fourth electrode tabs to each other,
wherein the second wing terminal extends outwardly from the second contact terminal, and
wherein the second wing terminal faces the first wing terminal.

10. The secondary battery pack of claim 9, further including:
a jig insertion space,
wherein the jig insertion space is defined by (i) the first and the second wing terminals, (ii) the second and the third battery cells, and (iii) the second and the third electrode tabs.

11. The secondary battery pack of claim 9, further comprising:
a terminal bus bar,
wherein the terminal bus bar is coupled to the first and the second wing terminals.

12. The secondary battery pack of claim 11,
wherein the terminal bus bar is coupled to the printed circuit board.

13. The secondary battery pack of claim 1, wherein the second structure includes:
a housing;
a barrier formed in the housing; and
a wiring harness and the printed circuit board which are disposed between the housing and the barrier.

14. The secondary battery pack of claim 1,
wherein the printed circuit board includes a contact terminal piece configured to measure a voltage, and
wherein the contact terminal piece contacts a terminal bus bar of the plurality of secondary battery modules to measure a voltage.

15. A secondary battery pack, comprising:
a plurality of secondary battery modules including battery cells and cooling fins;
a first structure disposed below the plurality of secondary battery modules for protecting the plurality of secondary battery modules and for cooling the plurality of secondary battery modules; and
a second structure provided over the plurality of secondary battery modules and coupled to the first structure such that the plurality of secondary battery modules are disposed therein, the second structure including a printed circuit board, wherein the first structure further includes:
a plate having a cooling channel therein;
a bracket extending along a first side of the plate configured to provide longitudinal rigidity of the plate; and
stepped parts formed over the plate configured to provide rigidity in the width direction of the plate perpendicular to the longitudinal direction and disposed apart from each other such that the plurality of secondary battery modules are partitioned and mounted between the stepped parts,
wherein the measurement control circuit is configured to measure and control a voltage of the plurality of secondary battery modules.

16. The secondary battery pack of claim 15,
wherein the second structure includes a contact terminal piece, and
wherein the contact terminal piece is mounted on the plurality of secondary battery modules, elastically contacts the measurement control circuit and the plurality of secondary battery modules, and electrically connects the measurement control circuit and the plurality of secondary battery modules to each other.

* * * * *